May 8, 1962 B. PARZEN 3,033,480

MAGNETIC TAPE RECORDER AND REPRODUCER

Filed March 10, 1960 2 Sheets-Sheet 1

INVENTOR.
BENJAMIN PARZEN
BY Darby + Darby
ATTORNEYS

May 8, 1962 B. PARZEN 3,033,480

MAGNETIC TAPE RECORDER AND REPRODUCER

Filed March 10, 1960 2 Sheets-Sheet 2

INVENTOR.

BENJAMIN PARZEN

BY Darby & Darby

ATTORNEYS

United States Patent Office 3,033,480
Patented May 8, 1962

3,033,480
MAGNETIC TAPE RECORDER AND REPRODUCER

Benjamin Parzen, Woodside, N.Y., assignor to The Siegler Corporation, Long Island City, N.Y., a corporation of Delaware Filed Mar. 10, 1960, Ser. No. 14,127
6 Claims. (Cl. 242—55.12)

This invention relates to magnetic tape recorders and reproducers and particularly to such an instrument having a plurality of tapes mounted on separate supply and take-up reels but driven by a common capstan drive.

By use of such a common capstan drive the frequent need for a multiple tape recorder occupying a minimum of space and of minimum weight is satisfied.

In the following specification the recorder is shown as having two tapes mounted on separate supply and take-up reels but it is obvious that more than two tapes can be utilized by minor modifications of the device here disclosed.

A recorder such as that mentioned, namely, one having a common capstan drive with a plurality of independent take-up and supply mechanisms effects a tremendous saving in the space and weight requirements and is particularly useful for airborne service.

It is an object of the invention to provide a magnetic tape recorder having a plurality of independent supply and take-up reels for independent tapes and a common capstan drive serving all of the tapes.

It is another object of the invention to provide such a plural tape recorder having the associated supply and take-up reels mounted on coaxial shafts with the reel supporting spider for the outermost take-up or supply reel, as the case may be, arranged to provide access for inserting or removing the innermost take-up or supply reel.

Another object of the invention is to provide such a recorder wherein all of the tapes of the plurality of tapes are driven by a single capstan and to provide means whereby the tapes may, if desired, be driven at different speeds.

Figure 1:
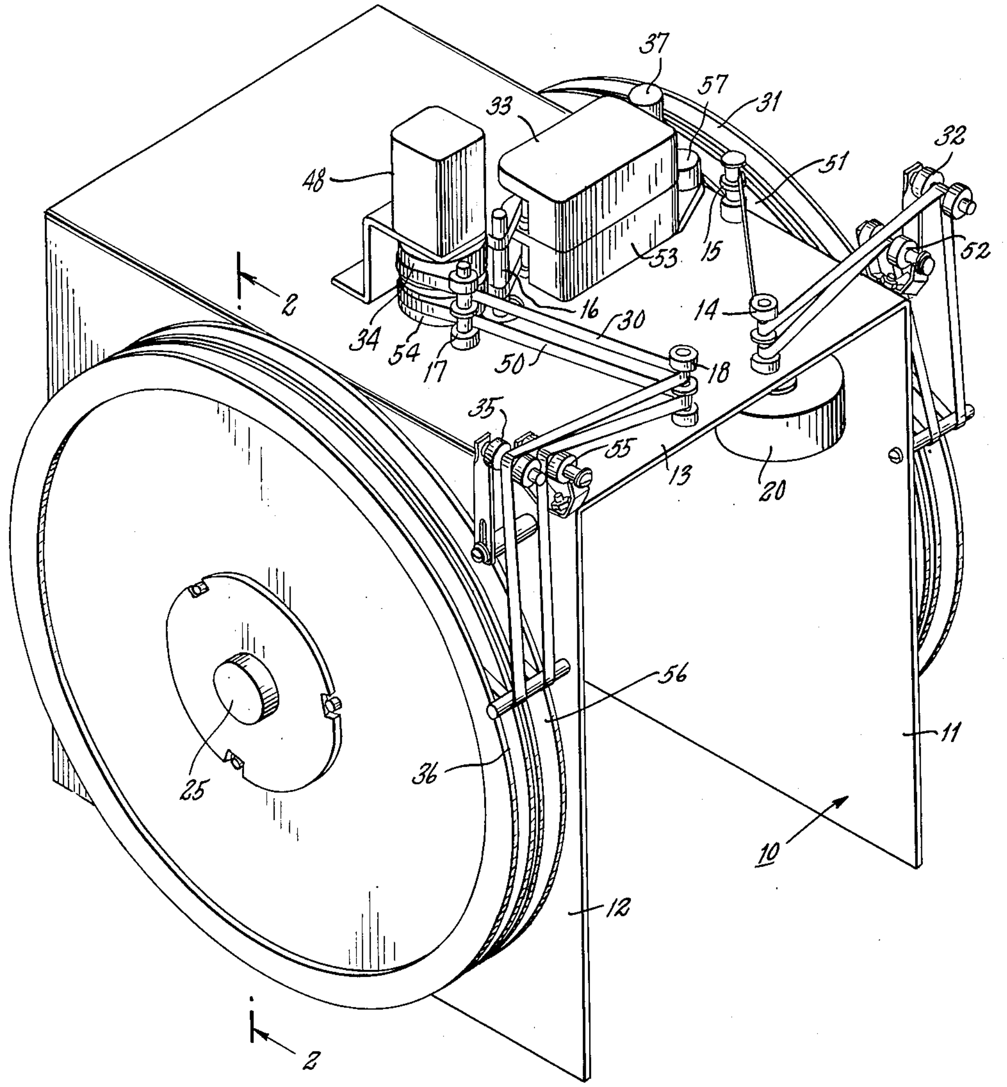
Figures 2, 3:
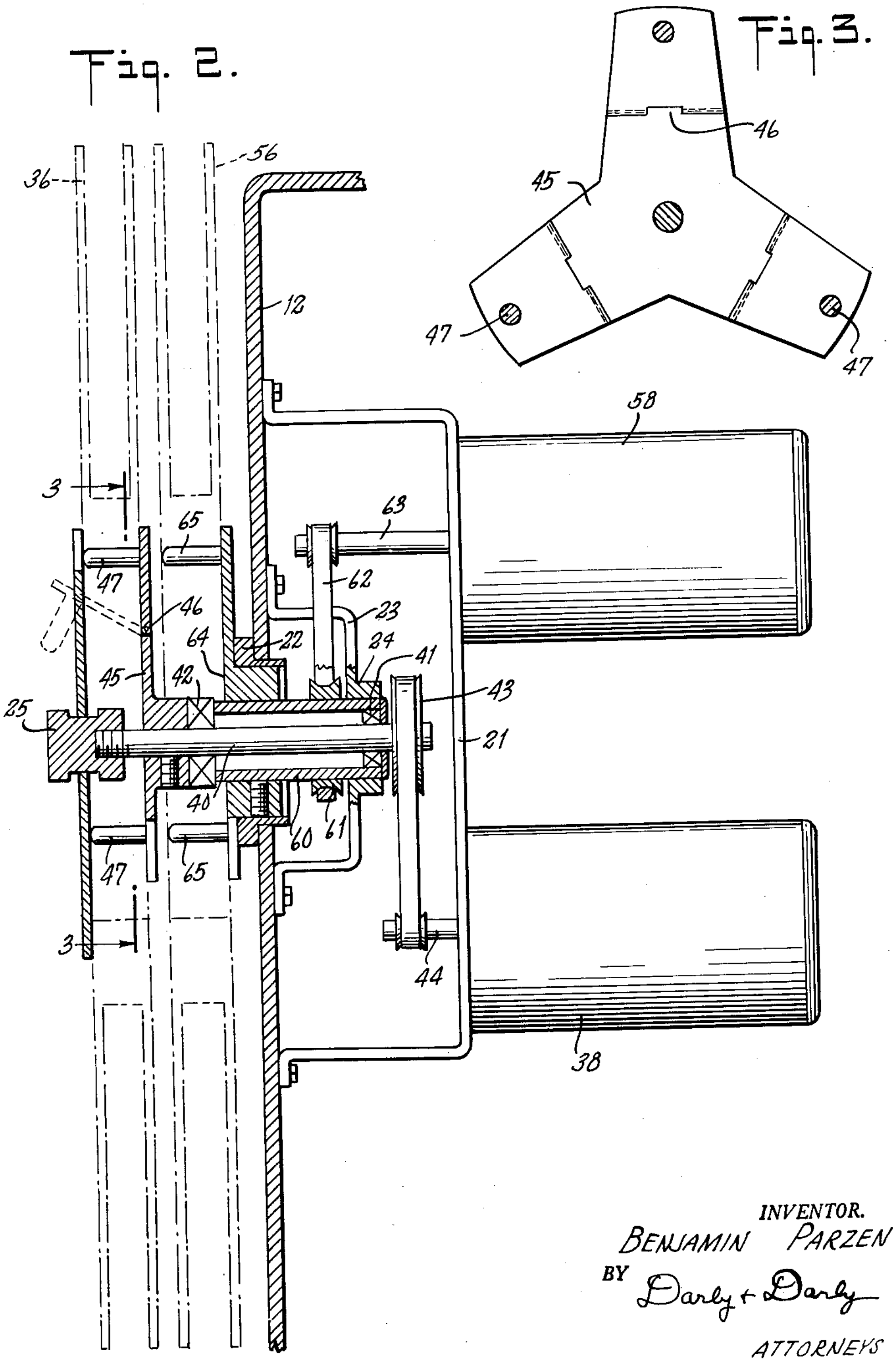

Other objects and features of the invention will be apparent when the following description is considered in connection with the annexed drawings, in which, FIGURE 1 is a perspective view of a dual tape recorder in accordance with my invention;

FIGURE 2 is a vertical cross-sectional view showing particularly the arrangement of the motor driven take-up reel spiders for the two independent tapes driven by the same capstan drive; and FIGURE 3 is a front elevational view of the outermost spider showing particularly the mode of folding the spider arms to make it possible to remove and replace a take-up reel on the innermost reel spider.

Referring now to the drawings and particularly to FIGURE 1, there is shown at 10 a frame member which supports the various mechanisms of the recorder. This frame is generally in the form of an inverted U having the supply reels mounted on the right hand upright 11, the take-up reels mounted on the left hand vertical member 12 and the recording heads, capstan, pinch rollers and various guide rods mounted on the upper surface of the horizontal frame member 13 with the motor drive for the capstan (not shown), the flywheel, and other mechanical elements of the capstan drive mounted within the U-shaped framework 10 suitably supported from the lower surface of the horizontal member 13 and from the uprights 11 and 12.

For convenience, the two tapes are designated 30 and 50 and all mechanisms individual to the drive of the tape 30 are given a reference character of the series 30 through 50 while all mechanisms individual to the tape 50 are given reference characters in the series from 50 to 70. Mechanisms which are common to the two tapes are given reference characters below 30.

Two supply reels 31 and 51 are provided. The two tapes pass from these supply reels over the guide rollers 32 and 52 respectively, thence around the guide rods 14 and 15, through the recording heads 33 and 53, around the capstan 16, (against which bear the pinch rollers 34 and 54) around the guide rods 17 and 18 and over the guide rollers 35 and 55 to the take-up reels 36 and 56.

The capstan 16 is driven by a motor (not shown) in the usual manner. Operated by the motor is a flywheel (not shown) which serves to smooth any speed fluctuations inherent in the motor and thus give a smooth even speed to the capstan. In addition to the common flywheel each tape 30 and 50 passes about one of the flywheel rollers 37 and 57 respectively each of which drives an individual flywheel. This roller 57 drives flywheel 20 and roller 37 drives a similar flywheel (not shown). These flywheels tend to maintain the speed of the individual tapes constant.

The driving arrangements for the take-up reels 36 and 56 will be described in detail by reference to FIGURES 2 and 3. It will be understood that the supply reels 31 and 51 may be similarly driven although in some instances this may not be necessary or desirable and instead friction elements may be utilized to keep the tape taut as it passes from the supply reel to the capstan.

Referring now to FIGURE 2, it will be seen that the drive motors 38 and 58 are mounted on a bracket 21 which is in turn fixed to the left hand upright frame member 12. Mounted in an aperture in frame member 12 is a bearing 22 and mounted in a bracket 23 supported from member 12 is another bearing 24. A sleeve 60 is rotatably supported in the bearings 22 and 24, this sleeve having fixed thereto a pulley 61 which is driven by a belt 62 from the shaft 63 of the motor 58. Fixed to the sleeve 60 near the outer end thereof is a spider 64 on which the tape reel 56 is positioned.

The spider 64 has three arms and is generally similar to the spider hereinafter discussed in connection with FIGURE 3, save that its arms are not hinged as are those of the spider of FIGURE 3. In each case, however, the tape reels are made with a central opening which is substantially of a radius equal to the distance from the center of the spider to the inner side of any one of the reel driving pins 65. The reel is provided with notches at three spaced points about the inner periphery which notches mate with and engage the driving spider pins 65.

Mounted within the sleeve 60 is the shaft 40, the shaft being supported by bearings 41 and 42 at opposite ends of the sleeve 60. At the innermost end of the shaft 40 is a pulley 43 driven by a pulley on the shaft 44 of the motor 38 and mounted on the outer end of the sleeve is a spider 45 in which the outer take-up reel 36 is mounted.

In order to provide for removal and replacement of the inner reel 56, the spider 45 is made with its three arms hinged as indicated at 46. Like the inner spider already described, each arm is provided with a drive pin 47, these drive pins engaging a tape reel in the same manner as pins 65.

As will be noticed by reference to FIGURE 2, the hinged outer arms of the spider 45 fold outwardly making it possible to remove a reel from the spider 64 since the arms will then pass through the central opening in that reel.

The outer end of shaft 40 is threaded and a retaining disk 25, having a central threaded opening therein, is screwed onto the shaft 40 and holds the outer reel in position.

As shown in FIGURE 1, a solenoid 48 is provided, which solenoid when operated moves the pinch roller 34 against the tape 30 on the capstan 16 causing the tape to be driven by the capstan. A similar solenoid (not shown) is provided for the pinch roller 54 and this solenoid in a like manner causes the pinch roller 54 to press the tape 50 against the driving capstan 16. As will be understood, the capstan is the chief driving element which assures that the tapes will proceed past the respective recording heads 33 and 53 at a uniform rate, the motors 38 and 58 serving only to put sufficient tension on the tape to wind it properly on the respective reel.

In some instances it may be desirable that the two tapes 30 and 50 proceed at different rates. This can be readily accomplished by providing a sleeve which fits over the capstan beneath one of the tapes to thereby increase the effective diameter of the capstan as respects that tape to thus increase the uniform speed at which that tape moves past its corresponding recording head. Since the motors 38 and 58 serve only to drive the take-up reels, no change is necessary in these motors in order to secure the different speeds in the manner mentioned above.

It will be seen that by the arrangement described two tapes may readily be driven by a single capstan and its motor drive, the arrangement being such that the tapes are maintained at a uniform speed as they pass the recording head which speed may, however, be different for each of the tapes. Moreover, by means of the arrangement disclosed the two recording mechanisms are substantially independent of one another while occupying much less space than would two separate recorders. At the same time, despite the reduction in space occupied, the tape reels are readily placed in operating position and removed from such position when desired. As indicated, the mechanism supplied for the take-up reels and described in detail may be duplicated for the supply reels or, if desired, motors such as 38 and 58 may be dispensed with and simple friction braking means substituted therefor.

As stated hereinabove, although a dual recording mechanism has been described, it will be obvious that a plurality of recording tapes and associated mechanisms might be employed by simple extensions of the principles here described. For example, by use of a second sleeve three take-up reels might be accommodated, this requiring merely the use of additional guide rollers and rods and additional recording heads and of course additional vertical length of the capstan 16.

While I have described a preferred embodiment of the invention, it will be understood that I wish to be limited not by the foregoing description, but solely by the claims granted to me.

What is claimed is:

1. In a recorder and reproducer for magnetic tape, in combination, a plurality of supply reels for a corresponding plurality of tapes to be recorded upon, a shaft having a spider mounted thereon for rotation therewith, said spider being adapted to receive one of said supply reels, a sleeve surrounding said shaft and rotatable with respect thereto, a spider mounted on said sleeve, said spider being adapted to receive a second of said supply reels, a corresponding number of tape take-up reels, a shaft for one of said take-up reels, said shaft having a spider mounted thereon for rotation therewith, said spider being adapted to receive one of said take-up reels, a sleeve surrounding said shaft and rotatable with respect thereto, a spider mounted on said sleeve, said sleeve being adapted to receive a second of said take-up reels, drive means for said take-up reel shaft, independent drive means for said take-up reel sleeve, a plurality of recording and reproducing heads equal in number to the number of tapes, each said head cooperating with one of said tapes, a common capstan for driving all said plurality of tapes, said capstan drive being located intermediate said supply reels and said take-up reels, and a plurality of pinch rollers equal in number to the number of tapes, said pinch rollers bearing against said tapes as they pass over said common capstan.

2. A recorder and reproducer as claimed in claim 1 wherein said shaft mounted supply and take-up reel spiders have arms terminating in hinged portions whereby a tape reel may be mounted on the respective sleeve mounted supply and take-up reel spiders by insertion over the folded spider arm portions of the shaft mounted spiders.

3. A recorder and reproducer as claimed in claim 2, wherein said take-up reel spiders have driving pins located adjacent the periphery of the spider arms, said pins being adapted to extend into notches extending radially outward from the inner periphery of cooperating tape reels.

4. A recorder and reproducer as claimed in claim 2, wherein said spiders have driving pins located adjacent the periphery of the spider arms, said pins being adapted to extend into notches extending radially outwardly from the inner periphery of cooperating tape reels, and wherein means are provided for holding tape reels on said sleeve and shaft mounted spiders, said means comprising a disk fixed to said spider drive shafts.

5. In a recorder and reproducer for magnetic tape, in combination, a channel-shaped supporting member, a pair of supply reels mounted on one vertical portion of said channel-shaped member, a pair of take-up reels mounted on the opposite vertical portion of said channel member, individual drive means for said take-up reels, a common capstan for driving both said tapes mounted on the horizontal portion of said channel member, a pair of recording heads mounted on said horizontal portion of said channel member adjacent said capstan on the side thereof remote from said take-up reels, and a pair of pinch rollers individually pressing one of said pair of tapes against said common capstan.

6. A recording and reproducing device in accordance with claim 5 wherein guide rollers are provided to direct said tape from said supply reels to said recording heads and from said common capstan to said take-up reels.

References Cited in the file of this patent

UNITED STATES PATENTS

| | | |
|---|---|---|
| 2,560,234 | Masterson | July 10, 1951 |
| 2,788,209 | Montijo | Apr. 9, 1957 |
| 2,913,192 | Mullin | Nov. 17, 1959 |
| 2,990,092 | Begun et al. | June 27, 1961 |